United States Patent Office 3,311,553
Patented Mar. 28, 1967

3,311,553
DRILLING FLUID
Walter J. Weiss, Sugar Land, and John S. Brukner and Clarence O. Walker, Houston, Tex., assignors to Texaco Inc., New York, N.Y., a corporation of Delaware
No Drawing. Filed Nov. 5, 1964, Ser. No. 409,293
11 Claims. (Cl. 252—8.5)

This application is a continuation-in-part of application Ser. No. 154,355 filed Nov. 22, 1961, now abandoned, which in turn is a continuation-in-part of application Ser. No. 785,800 filed Jan. 9, 1959, now abandoned.

This invention relates to the drilling of wells through subsurface formations while employing drilling fluids. More particularly, this invention relates to a drilling operation, such as a rotary drilling operation, which involves the circulation of a dispersed drilling gyp mud through the well bore and about the drilling bit.

A dispersed gyp drilling mud is a low alkalinity, relatively low pH, calcium-containing drilling fluid having a clay dispersing agent therein. Such a gyp mud is usually characterized by an aqueous phase having a pH in the range of about 8 to 10.7 when measured before the mud is subjected to the high temperatures encountered in the borehole, a calcium ion concentration in the aqueous phase thereof resulting from the addition of gypsum or calcium sulfate of at least 200 parts per million by weight, such as a calcium ion concentration in the range 300 to 2000 p.p.m. Dispersed gyp muds also usually contain dissolved therein a minor amount of an alkaline material, such as an alkali metal and/or alkaline earth metal hydroxide, e.g., caustic soda, usually in an amount in the range 0.1 to 1.0 lb. per barrel sufficient to impart the desired alkalinity and/or pH to the resulting drilling mud, i.e., a pH within the above range and substantially below that of a saturated aqueous solution of calcium hydroxide.

There is also advantageously incorporated in these drilling muds a suitable amount of a water loss agent, such as hydrolyzed starch or carboxymethylcellulose (CMC) in a minor amount usually in the range of about 0.2 to 5 lbs., per barrel of drilling fluid to improve the water loss properties thereof. In a dispersed gyp mud the calcium ion concentration in the aqueous phase is usually obtained by incorporating or dissolving in the drilling mud a sufficient amount of a water soluble calcium salt such as a calcium sulfate to yield the desired calcium ion concentration. Usually calcium sulfate or gypsum in an amount in the range 1 to 10 lbs. per barrel of drilling fluid is sufficient to impart the desired calcium ion concentration in the aqueous phase thereof.

Also, there can be desirably incorporated or emulsified therein a minor amount of oil so as to improve the lubricating properties and lubricity of the drilling fluid. When oil is incorporated in a gyp mud there is also present in the drilling fluid a suitable oil emulsifying agent therefor.

In addition to the above materials there is also incorporated in a gyp drilling mud a suitable clay dispersing agent to maintain the drilling clay particles and clayey material in suspension therein and to control the viscosity of the resulting drilling mud. Any suitable clay dispersing agent suitable for dispersing clayey particles or drilling clay material in the drilling mud may be employed. Suitable dispersing agents include the various lignosulfonates. Particularly suitable as a dispersing agent in gyp drilling muds is a heavy-metal-containing lignosulfonate, such as a ferrochrome-containing lignosulfonate. A particularly useful ferrochrome-containing lignosulfonate is a material manufactured in accordance with U.S. 2,935,473 and U.S. 2,935,504 and sold under the trade name Q-Broxin by Puget Sound Pulp and Paper Company. This material, a ferrochrome-containing lignosulfonate, containing iron in an amount of about 3.5% (calculated as $Fe_2O_3$) and chromium in an amount of about 0.20% by weight has been found to be particularly satisfactory as a dispersing agent for clayey material in gyp muds.

The properties of various conventional dispersed gyp muds are set forth hereinbelow in Table I.

TABLE I

| Property | Gyp Mud | | | |
|---|---|---|---|---|
| | A | B | C | D |
| Wt., lbs. per gal. | 10.7 | 15 | 15.4 | 15.4 |
| Viscosity funnel, sec. API | 34 | 60 | 58 | 47 |
| Viscosity Stormer cp | 6 | 55 | 81 | 46 |
| Initial gel, gm | 0 | 0 | 0 | 0 |
| 10 min. gel, gm | 4 | 5 | 0 | 8 |
| Filtrate, cc. API | 8.9 | 5 | 4.2 | 4.9 |
| pH | 8 | 9.5 | 8.5 | 8.5 |
| Calcium p.p.m. | 700 | 1,040 | 1,000 | 1,080 |
| Chloride, p.p.m. | 1,000 | 1,000 | 1,200 | 1,100 |

It has been found, however, that when gyp muds are employed in a drilling operation wherein the drilling mud becomes exposed to a relatively high temperature, such as a temperature above about 250° F. during the drilling operation the drilling mud deteriorates as evidenced by a material increase in the viscosity of the drilling mud, coupled with the formation of an undesirable viscous gel.

It is an object of this invention to provide a gyp mud having improved high temperature properties.

It is another object of this invention to provide a drilling reagent additive material suitable for the preparation and/or maintenance of a gyp drilling fluid characterized by a pH in the range of about 8 to 10.7, a relatively high dissolved calcium content and improved high temperature gelation properties.

It is another object of this invention to provide an improved drilling method.

How these and other objects are accomplished will become apparent in the light of the accompanying disclosure. In at least one embodiment of the practice of this invention at least one of the foregoing objects will be achieved.

In commonly owned U.S. 2,868,726, there is disclosed that a drilling fluid adaptable for drilling through heaving shale formations, conventionally referred to as a shale control type drilling fluid, is improved with respect to its high temperature gelation properties by incorporating in the shale control drilling fluid a minor amount of a particular group of water soluble inorganic metal compounds. Suitable water soluble inorganic metal compounds are selected from the aluminum-, chromium-, molybdenum-, nickel-, cobalt-, and iron-containing compounds or mixtures thereof. Compounds containing these elements either in anionic or cationic form are effective in improving the high temperature gelation properties of the high pH shale control muds. The patent discloses at column 5, lines 4 to 35, that the following compounds are satisfactory to control the high temperature gelation properties of shale control muds.

"Exemplary inorganic, water soluble aluminum-containing compounds include aluminum chloride, potassium aluminate, aluminum nitrate, aluminum sodium chloride and aluminum sulfate. Suitable inorganic, water soluble chromium-containing compounds include ammonium dichromate, chromic bromide, chromic oxide, chromic nitrate, chromic sulfate, chromous chloride, potassium chromate and potassium dichromate. Suitable inorganic, water soluble molybdenum-containing compounds include molybdenum-tetrachloride, molybdenum pentachloride, molybdenum oxychloride, potassium molybdate. Suitable inorganic, water soluble nickel-containing compounds include nickel ammonium chloride, nickel ammonium sulfate, nickel carbonate, nickel chloride ammonia, nickel chloride, nickel nitrate, nickel perchlorate, nickel potassium cyanide and nickel sulfate. Suitable inorganic, water soluble cobalt-containing compounds include cobaltic chloride, cobaltic sulfate, cobaltous ammonium chloride, cobaltous ammonium sulfate, cobaltous bromide, cobaltous fluoride, cobaltous hydroxide, cobaltous iodide, cobaltous nitrate and cobaltous sulfate. Suitable inorganic, water soluble iron-containing compounds include ferrous bromide, ferrous ferrocyanide, ferrous iodide, ferrous perchlorate, ferric bromide, ferric nitrate, ferric chloride, ferric sulfate, ferric thiocyanate and ferrosoferric chloride. As already indicated, the above water soluble inorganic metal-containing compounds may be added alone or in admixture in any suitable proportions per se or together with the other ingredients going to make up a drilling mud in accordance with the practice of this invention."

A shale control type drilling fluid and a gyp type drilling fluid are distinct from each other. The basic difference is that the shale control mud hardens shale due to the soluble calcium ion content and hydroxide alkalinity working together which appears to cause an irreversible reaction to take place with the shale whereby the latter is solidified or hardened. It is a relatively high pH, high soluble calcium ion type mud.

A shale control drilling fluid has a pH of not above 12.6, normally between about 11 and 12.5; contains calcium hydroxide, preferably as lime, in an amount to provide a saturated solution thereof; contains a water-soluble calcium salt having a water solubility greater than calcium hydroxide dissolved in the aqueous phase, chiefly calcium chloride, used to provide a calcium ion concentration in the aqueous phase of at least 200 p.p.m., generally 300 to 1000 p.p.m. or more.

In a shale control type mud, the hydroxide alkalinity of the mud filtrate $P_f$ is from about 0.5 to 2.0, preferably 1.0 to 1.5; the hydroxide alkalinity of the whole mud $P_m$ is from about 7 to 14. In shale control mud systems, the $P_f$ value is related to the hydroxyl ion from the lime. An adequate concentration is required to function with the calcium ions to initiate and insure hardening of the shale. The $P_m$ value indicates the rapidly available hydroxide alkalinity from the whole mud.

In contrast, a gyp type mud does not harden shale because the hydroxide alkalinity is too low to bring about the shale hardening reaction although the calcium ion concentration is high. A gyp mud has a high calcium solubility but a relatively low pH. A gyp type mud has a pH in the range of from about 8 to 10.7, when determined before the mud is subjected to the high temperatures encountered in the borehole during drilling operations, preferably a pH between about 8.5 to 10.5; does not contain insoluble calcium hydroxide; contains calcium sulfate or gypsum to saturate the aqueous phase with Ca++ ions in an amount above about 200 p.p.m., generally 600 to 1400 p.p.m.

In a gyp type mud the hydroxide alkalinity of the mud filtrate $P_f$ is generally lower than 0.5, normally about 0.2, and is normally due to the caustic soda added to the mud to neutralize the acidity of the thinner, and to buffer the system to a pH for optimum dispersion, for example, a ferrochrome-lignosulfonate such as Q-Broxin. The hydroxide alkalinity of the whole gyp mud, $P_m$, is normally less than 1.

The $P_f$ of a mud refers to the number of cc. of N/50 sulfuric acid required to obtain a phenolphthalein end point in a one cc. sample of mud filtrate. The $P_m$ of a mud refers to a sample of whole mud (solids plus filtrate) and is reported as the number of cc. of N/50 sulfuric acid needed to obtain a phenolphthalein end point in 1 cc. of the mud. In determining the $P_m$ value in a shale control mud, the sulfuric acid reacts with anything in suspension or on the mud solids which is rapidly neutralizable, including undissolved or dissolved lime. In contrast in a gyp mud, the acid reacts with anything in the mud which is readily neutralizable, and any excess hydroxyl ion above that needed for neutralization of the thinner. In a gyp mud there is no hydroxyl ion present which is obtained from undissolved lime. This illustrates the basic difference between shale control and gyp muds in that the shale control mud has an aqueous phase saturated with calcium hydroxide whereas the gyp mud does not.

It has been found that a specific group of compounds, namely the soluble alkali metal and ammonium chromates and dichromates, calcium chromate, and mixtures thereof are particularly effective in improving the high temperature properties of gyp type drilling fluids. More particularly, this invention resides in the discovery that the anionic form of chromium compounds, as the alkali metal including ammonium and double alkali metal chromates, including dichromates, and mixtures thereof are especially effective in providing superior high temperature gelation properties to gyp type drilling fluids.

The other types of compounds disclosed in U.S. 2,868,726, namely the aluminates, molybdates, iron compounds, nickel compounds and cobalt compounds are not effective in improving the high temperature gelation properties of gyp type drilling fluids. The treatment of a gyp type drilling fluid with chromium in the cationic form such as, for example, chromium fluoride does not improve the high temperature gelation properties of the mud.

In accordance with the present invention a dispersed gyp mud, that is, an aqueous drilling mud or drilling fluid containing clay and a dispersing agent and characterized by an aqueous phase which has a pH in the range of about 8 to 10.7 and a dissolved calcium content or calcium ion concentration in the aqueous phase thereof of at least 200 parts per million by weight, is improved as to high temperature properties by incorporating therein a minor amount of more than 0.25 pound and not above about 8 pounds per barrel of a water soluble alkali metal- or ammonium- or double alkali metal-chromates and/or -dichromates or mixtures thereof, such as sodium chromate, ammonium dichromate, sodium ammonium chromate and potassium sodium chromate. This range, 0.25 to 8 pounds per barrel, is equivalent to about 0.06 to 1.92 weight percent.

The 0.25 pound per barrel is about 0.06 percent by weight based on a drilling mud weighing about 10 pounds per gallon.

Accordingly, a drilling mud in accordance with this invention contains water, dispersed hydratable drilling clay material therein, a dispersing agent for said hydratable clayey material, a water soluble calcium salt such as calcium sulfate having a solubility in water sufficient to impart the desired calcium ion concentration in the aqueous phase thereof, from 0.1 to 10 weight percent of a water soluble alkali metal or ammonium chromate and/or dichromate, mixtures thereof or the double alkali metal salts of such compounds, and, if desired, a suitable alkalinity agent such as caustic soda in an amount sufficient to adjust the pH of the aqueous phase of the resulting drilling mud to a value in the range of about 8 to 10.7, but with the aqueous phase being unsaturated with calcium hydroxide.

A drilling fluid in accordance with this invention may be prepared in the first instance by the addition to water of a suitable drilling fluid reagent admixture prepared in accordance with the teachings of this invention together with, if desired, a minor amount of an alkalinity agent such as sodium hydroxide, or by the addition of the special drilling mud additive of this invention to water containing hydratable drilling clay material dispersed therein, together with the addition of the usual drilling mud additives (water loss additive, weighing material, oil, emulsifying agent, and the like). Further, if desired, a conventional aqueous drilling fluid may be converted by the addition thereto of an alkaninity agent such as caustic soda, a water soluble calcium salt such as calcium sulfate and a clay dispersing agent, together with an alkali metal or ammonium chromate and/or dichromate, mixtures thereof or the double alkali metal salts of these compounds to yield an improved drilling fluid in accordance with the teachings of this invention.

In the preparation of an improved drilling fluid in accordance with this invention a drilling mud additive material is conveniently employed. In accordance with one embodiment a drilling mud additive material suitable for use in the practice of this invention includes an admixture of a water soluble calcium salt, such as calcium sulfate, a dispersing agent for clayey material such as a ferrochrome-containing lignosulfonate and a water soluble inorganic alkali metal-, double alkali metal- or ammonium-chromate and/or -dichromate or mixtures thereof such as sodium chromate in the weight range ratio 0.1–10:0.1–10:0.125–2, respectively. This admixture when employed in the preparation of an improved gyp mud in accordance with this invention is incorporated in the drilling fluid in an amount in the range 5 to 20 pounds per barrel of drilling fluid.

The following tests are indicative of the practice of this invention and demonstrate how the high temperature properties of a dispersed gyp drilling mud characterized by an aqueous phase having a pH in the range of about 8 to 10.7 and a dissolved calcium content of at least 200 parts per million by weight, are improved by incorporating or othewise adding or associating with the drilling fluid a water soluble alkali metal or ammonium chromate or dichromate such as sodium chromate. In the tests a dispersed gyp aqueous drilling mud having a high solids content, such as a solids content of about 19.5% by volume, and containing calcium sulfate or gypsum dissolved in the aqueous phase thereof together with a suitable amount of Q-Broxin as the clay dispersing agent was employed. To the resulting gyp mud there was incorporated varying amounts of sodium chromate. Various physical properties of the mud both before and after treatment were then observed. The results of these tests are set forth in accompanying Table II.

TABLE II

| Mud Sample | Treatment | Rolling time at 350° F., hrs. | Static time at 360° F., hrs. | pH | Dissolved calcium, p.p.m. | Observed Fluidity |
|---|---|---|---|---|---|---|
| 1 | None | | | 9.55 | 720 | Fluid. |
| 2 | do | 24 | | 6.8 | 720 | Fluid to Plastic. |
| 3 | do | | 24 | 7.10 | 800 | Plastic. |
| 4 | Sodium chromate 1 lb./bbl | | | 9.7 | 680 | Fluid. |
| 5 | do | 24 | | 7.0 | 800 | Do. |
| 6 | do | | 24 | 7.58 | 760 | Do. |
| 7 | Sodium chromate 2 lbs./bbl | | | 9.8 | 720 | Do. |
| 8 | do | 24 | | 7.2 | 760 | Do. |
| 9 | do | | 24 | 6.85 | 800 | Do. |

It is to be noted in this and in the succeeding tables that in some instances the pH of the samples are less than the normal pH range for gyp muds. This is caused by the samples being subjected to relatively high temperatures before evaluation.

Additional tests were carried out on a conventional dispersed gyp-Q-Broxin mud which had been employed in a drilling operation. The dispersed gyp mud tested possessed the following properties: weight—11.2 lbs. per gallon; about 20% by volume of clay solids, 8% by volume oil emulsified therein using minor amounts of a conventional oil emulsifier as the emulsifying agent. Samples of the above described dispersed gyp mud were tested after incorporating therein alkali metal chromates in accordance with this invention to improve the high temperature properties thereof. The resulting treated and untreated drilling muds were then subjected to various tests. The results of these tests are set forth in accompanying Table III.

TABLE III

| Sample | Treatment | Stormer Visc., ° cpe. | | Ca++, p.p.m. | pH | Properties after heating 24 hrs. at 320° F. shear lbs./100 ft.² |
|---|---|---|---|---|---|---|
| | | 600 r.p.m. | 100 r.p.m. | | | |
| 1 | None | [1] 41.8 Fluid to [1] 31.2 Viscous [1] 33.5 [1] 85.9 | [1] 110.8 Plastic [2] [1] 48.1 Fluid [2] [1] 49.2 [1] 355.9 | [1] 526 [1] 380 [1] 400 | [1] 8.8 [2] 6.61 [1] 10.0 [2] 6.78 [1] 10.0 [2] 6.77 | 775 |
| 2 | 1.5 lbs. per bbl. sodium chromate | | | | | 365 |
| 3 | 1.5 lbs. per bbl. lithium chromate | | | | | 130 |

[1] Before bombing for 24 hrs. at 320° F.
[2] After bombing for 24 hours at 320° F.

Table III shows that the addition of 1.5 pounds of sodium or lithium chromate to a gyp mud imparted to the resultant muds desirable high temperature properties, as shown by the lower shear values and lower viscosities.

Additional tests were carried out on a field gyp mud obtained from the East Hackberry field to which had been added 10 pounds per barrel of "Baroco" clay. The base mud was chosen to provide a low shear strength mud to obtain measurable flow properties after high temperature aging. Samples of this mud were tested before and after adding 1.5 lbs. per barrel of each of the indicated inorganic salts thereto. The resulting treated muds were then tested and the results obtained are shown in the following tables.

TABLE IV

| Sample | PV | YP | Ap. Vis., cpc. | Shearometer gels, lb./100 ft.[2] | | pH | $P_f$, cc. | Ca—, p.p.m. |
|---|---|---|---|---|---|---|---|---|
| | | | | 0[1] | 10[1] | | | |
| 1. Base mud | 29 | 15 | 36.5 | 0[1] | 0[29.5] | 10.2 | .2 | 720 |
| 2. Base mud plus Na chromate | 23.5 | 11 | 29 | 0[1] | 0[33.5] | 10.2 | .2 | 760 |
| 3. Base mud plus N/ chloride | 29.5 | 21.5 | 40.25 | 3.5 | 9.0 | 10.1 | .15 | 696 |
| 4. Base mud plus Co sulfate | 26 | 13.5 | 32.75 | 0[1.2] | 4.0 | 10.1 | .15 | 640 |
| 5. Base mud plus Na ferrocyanide | 32.5 | 19.5 | 42.25 | 0[1.2] | 4.3 | 10.0 | .15 | 804 |
| 6. Base mud plus Na molybdate | 35 | 8 | 39 | 0[1] | 0[18] | 10.1 | .2 | 656 |
| 7. Base mud plus Na aluminate | 37 | 2 | 38 | 0[1.6] | 3.8 | 10.6 | .3 | 624 |

TABLE IVa.—PROPERTIES AFTER HEATING 24 HRS. AT 300° F.

| Sample | Ap. Vis. | PV | Yield Point |
|---|---|---|---|
| 1. Base mud | 100 | 18 | 164 |
| 2. Base mud plus Na chromate | 77.5 | 67 | 21 |
| 3. Base mud plus Ni chloride | 93 | 20 | 146 |
| 4. Base mud plus Co sulfate | 86 | 21 | 130 |
| 5. Base mud plus Na ferrocyanide | 97.5 | 7 | 181 |
| 6. Base mud plus Na molybdate | 92 | 17 | 150 |
| 7. Base mud plus Na aluminate | PLASTIC | | |

TABLE IVb.—PROPERTIES AFTER HEATING 12 HOURS AT 350° F.

| Sample | Ap. Vis. | PV | Yield Point |
|---|---|---|---|
| 1. Base mud | PLASTIC | | |
| 2. Base mud plus Na chromate | 84.5 | 54 | 61 |
| 3. Base mud plus Ni chloride | 107 | 19 | 176 |
| 4. Base mud plus Co sulfate | 99.5 | 19 | 161 |
| 5. Base mud plus Na ferrocyanide | PLASTIC | | |
| 6. Base mud plus Na molybdate | 142.5 | 20 | 245 |
| 7. Base mud plus Na aluminate | 96 | 23 | 146 |

TABLE IVc.—PROPERTIES AFTER HEATING 20 HOURS AT 350° F.

| Sample | Ap. Vis. | PV | Yield Point |
|---|---|---|---|
| 1. Base mud | PLASTIC | | |
| 2. Base mud plus Na chromate | 88.5 | 25 | 127 |
| 3. Base mud plus Ni chloride | PLASTIC | | |
| 4. Base mud plus Co sulfate | PLASTIC | | |
| 5. Base mud plus Na ferrocyanide | PLASTIC | | |
| 6. Base mud plus Na molybdate | PLASTIC | | |
| 7. Base mud plus Na aluminate | PLASTIC | | |

Table IVa shows the results of high temperature tests performed on the gyp drilling fluid containing the various materials. Of particular significance is the very low yield point value obtained with sodium chromate (21), a value more than 6 times smaller than the yield point value obtained with the gyp mud containing cobalt sulfate. The yield point values shown for nickel chloride, sodium ferrocyanide and sodium molybdate are also considerably more than the value obtained with sodium chromate. The data show that sodium aluminate was ineffective, since no measurable yield point value could be obtained.

Table IVb shows the results of additional high temperature evaluations of the base gyp mud containing the same amounts of materials as used in Table IVa.

The data in Table IVb were obtained by heating the samples for shorter time interval (12 hrs.) but at a higher temperature (350° F.) than the time and temperature employed in Table IVa. Table IVb shows that sodium ferrocyanide was an ineffective high temperature stabilizing agent as the sample did not yield a measurable yield point value. Although the materials tested other than chromate, namely the nickel, cobalt, molybdate and aluminate compounds exhibited measurable yield point values in this test, nevertheless all values were more than twice the very low yield point value (61) obtained with chromate.

Table IVc shows the results of additional high temperature evaluations on the same compounds used in previous tests. In this series, the heating time was 20 hours and the temperature at 350° F.

Inspection of the data in Table IVc shows that all of the test compounds with the exception of chromate exhibited unmeasurable yield point values. These results confirm that the nickel, cobalt, iron, molybdenum and aluminum containing compounds are unsatisfactory high temperature stabilizing materials in gyp mud systems. Further, the test results show the specificity of the chromates in imparting high temperature stabilizing properties to a gyp mud.

The results in the Tables IVa–c above demonstrate the specificity of the chromates in providing high temperature stabilizing properties to gyp drilling fluids. As shown in the tables, gyp muds containing such materials exhibited very low yield point values after heating for relatively long periods of time at high temperature.

From the above results, it is apparent that the specific compounds of the invention, chromates and polychromates, possess unexpected advantages when incorporated in gyp drilling fluids to control high temperature gelation that are not possessed by other compounds such as those shown in U.S. 2,868,726, namely, other nickel, iron, cobalt, molybdenum and aluminum-containing forms and more specifically, the chromium compounds recited therein, namely chromic bromide, chromic oxide, chromic nitrate, chromic sulfate and chromous chloride. The above specifically named compounds of chromium are ineffective to control the high temperature gelation properties of gyp muds.

These data effectively illustrate the specificity of the compounds of this invention, namely, the alkali metal-, double alkali metal- or ammonium-chromates, -dichromates and mixtures thereof in imparting desirable high temperature stabilizing properties to gyp mud systems.

The following data demonstrate further the specificity of the alkali metal chromate and polychromate compounds of this invention in improving the high temperature properties of gyp muds, as the chromates are ineffective in other mud systems.

Table V below shows the results obtained by the incorporation of varying amounts of sodium chromate to a Bay Water Spud Mud from a Louisiana well site. This sea water mud had a weight of 11.0 lbs./gal. and contained 18.5 % by volume of Fann solids.

The mud consisted of a mixture of salty bay water, approximately 23,000 p.p.m. sodium chloride, with formation solids from the well bore; but with no other chemical treatment.

TABLE V.—EFFECT OF SODIUM CHROMATE IN SEA WATER MUD

|  | Amount, lbs./bbl. | Fann, $0^1$ | Gels $10^1$ | Fann, PV | Visc., YP | Ca++ p.p.m. | Properties after heating 24 hours at 300° F. | |
|---|---|---|---|---|---|---|---|---|
|  |  |  |  |  |  |  | Shear, lbs./100 ft.$^2$ | Appearance |
| 1. Base mud |  | 16 | 22 | 9 | 21 | 880 | <70 | F-VLG.* |
| 2. Base mud + sodium chromate | ½ | 19 | 22 | 9 | 28 | 900 | <70 | F-VLG.* |
| 3. Base mud + sodium chromate | 1 | 20 | 27 | 8 | 34 | 580 | <70 | F-VLG.* |
| 4. Base mud + sodium chromate | 2 | 24 | 29 | 7 | 41 | 600 | <70 | F-VLG.* |
| 5. Base mud + sodium chromate | 4 | 28 | 32 | 10 | 39 | 460 | 110 | F-VLG.* |

* F-VLG = Fluid Very Low Gels.

It is evident from the data in Table V that chromates did not improve the high temperature properties of this sea water mud.

Further data illustrating the specificity of the compounds of this invention for gyp mud systems are illustrated in the following tests conducted on a clay-water mud containing sodium chromate. The clay-water mud contained 10 percent by weight of "Hi-Yield" clay solids in water. The results are shown in Table VI.

TABLE VI

|  | Shearometer, gels | | Fann, PV | Visc., YP | Properties after heating 8 hrs. at 300° F. | |
|---|---|---|---|---|---|---|
|  | $0^1$ | $10^1$ |  |  | Shear, lbs./100 ft.$^2$ | Appearance |
| 1. Base mud | 7 | 8 | 24 | 34 | 150 | Fluid, high gels. |
| 2. Base mud + 0.5 lbs./bbl. sodium chromate | 24 | 25 | 22 | 44 | + 220 | Do. |
| 3. Base mud + 1 lb. per bbl. sodium chromate | 40 | 45 | 16 | 59 | + 275 | Do. |

Table VI shows that alkali metal chromates are not effective in improving the high temperature properties of a clay-water mud, and in such systems acts as a flocculating agent to a basic clay-water mud.

As will be apparent to those skilled in the art in the light of the foregoing disclosure many modifications, changes and substitutions are possible in the practice of this invention without departing from the spirit or scope thereof.

We claim:

1. An aqueous drilling fluid comprising an aqueous phase which is unsaturated with calcium hydroxide, said aqueous phase having dispersed therein an amount of solids above 10% by volume based on said drilling fluid and calcium sulfate dissolved therein to yield a calcium ion concentration of at least 200 parts per million by weight and containing from 0.25 to about 8 pounds per barrel of a water soluble chromate selected from the group consisting of alkali metal and ammonium, chromates, polychromates and mixtures thereof, said aqueous phase having a pH in the range of from about 8 to about 10.7, a filtrate alkalinity of less than about 0.5 cc. of 0.02 N sulfuric acid and a drilling fluid alkalinity of less than about 1 cc. of 0.02 N sulfuric acid, per 1 cc. of aqueous filtrate and per 1 cc. of aqueous drilling fluid, respectively, to phenolphthalein end point.

2. A drilling fluid in accordance with claim 1 wherein said water soluble chromate is sodium chromate.

3. A drilling fluid in accordance with claim 1 wherein said water soluble chromate is sodium dichromate.

4. A drilling fluid in accordance with claim 1 wherein said water soluble chromate is ammonium chromate.

5. A drilling fluid in accordance with claim 1 wherein said water soluble chromate is sodium chromate.

6. A drilling fluid in accordance with claim 1 wherein the pH of said aqueous phase is in the range of about 8.5 to 10.5.

7. A drilling fluid in accordance with claim 1 wherein said pH in the range 8.5 to 10.5, said calcium ion concentration is in the range of about 500 to 2000 p.p.m. and wherein said water soluble chromate is sodium chromate.

8. In the drilling of a borehole through a subterranean formation wherein a drilling fluid is passed through the borehole in contact with said formation during the drilling operation, the improvement which comprises contacting said formation with an aqueous drilling fluid comprising an aqueous phase which is unsaturated with calcium hydroxide, contains dispersed therein an amount of solids above about 10% by volume based on said drilling fluid, contains calcium sulfate dissolved therein to yield a calcium ion concentration of at least 200 parts per million by weight and containing from about 0.25 to about 8 pounds per barrel of a water soluble chromate selected from the group consisting of alkali metal and ammonium chromates, dichromates and mixtures thereof, said aqueous phase having a pH in the range of from about 8 to about 10.7, a filtrate alkalinity of less than about 0.5 cc. of 0.02 N sulfuric acid and a drilling fluid alkalinity of less than about 1 cc. of 0.02 N sulfuric acid, per 1 cc. of aqueous filtrate and per 1 cc. of aqueous drilling fluid, respectively, to phenolphthalein end point.

9. A method in accordance with claim 8 wherein said water soluble chromate is sodium chromate.

10. A method in accordance with claim 8 wherein said water soluble chromate is a mixture of sodium chromate and sodium dichromate.

11. A method in accordance with claim 8 wherein said water soluble chromate is lithium chromate.

References Cited by the Examiner

UNITED STATES PATENTS

| | | | |
|---|---|---|---|
| 2,868,726 | 1/1959 | Brukner et al. | 252—8.5 |
| 2,935,504 | 5/1960 | King et al. | 252—8.5 |

OTHER REFERENCES

Hurdle: Gyp Muds Now Practical for Louisiana Coastal Drilling, article in the Oil and Gas Journal, Oct. 28, 1957 pp. 93, 94 and 95.

LEON D. ROSDOL, *Primary Examiner.*

JULIUS GREENWALD, H. B. GUYNN,
*Assistant Examiners.*